United States Patent
Santini et al.

(10) Patent No.: US 9,487,058 B2
(45) Date of Patent: Nov. 8, 2016

(54) COMPOSITE STRUCTURAL ELEMENT, PARTICULARLY FOR A VEHICLE SUSPENSION, AND METHOD FOR MANUFACTURING THE SAME

(75) Inventors: Andrea Santini, Turin (IT); Piero Monchiero, Turin (IT); Guido Borgna, Turin (IT)

(73) Assignee: SISTEMI SOSPENSIONI S.p.A., Corbetta (Milan) (IT)

(*) Notice: Subject to any disclaimer, the term of this patent is extended or adjusted under 35 U.S.C. 154(b) by 0 days.

(21) Appl. No.: 13/697,413

(22) PCT Filed: May 12, 2011

(86) PCT No.: PCT/EP2011/057676
§ 371 (c)(1),
(2), (4) Date: Nov. 12, 2012

(87) PCT Pub. No.: WO2011/141538
PCT Pub. Date: Nov. 17, 2011

(65) Prior Publication Data
US 2013/0205591 A1    Aug. 15, 2013

(30) Foreign Application Priority Data
May 12, 2010  (IT) .............................. TO2010A0395

(51) Int. Cl.
*B29D 24/00* (2006.01)
*B60G 7/00* (2006.01)
(Continued)

(52) U.S. Cl.
CPC .............. *B60G 7/001* (2013.01); *B29D 24/002* (2013.01); *B62D 29/001* (2013.01); *B62D 29/004* (2013.01); *E04C 3/28* (2013.01); *B29C 65/02* (2013.01); *B29C 65/48* (2013.01); *B29C 66/5414* (2013.01); *B29C 66/721* (2013.01);
(Continued)

(58) Field of Classification Search
CPC .............. B60G 7/001; B60G 2206/01; B60G 2206/012; B60G 2206/10; B62D 29/001; B62D 29/005; B62D 21/00
USPC ........................................ 29/897.2, 428, 463
See application file for complete search history.

(56) References Cited

U.S. PATENT DOCUMENTS 4,625,995 A * 12/1986 Aubry et al. .......... 280/124.128
4,753,456 A *  6/1988 Booher .................. 280/124.134
(Continued)

FOREIGN PATENT DOCUMENTS

DE      19814792 A1    10/1999
DE      20009695 U1     8/2000
(Continued)

OTHER PUBLICATIONS

May 26, 2011 International Search Report for PCT/EP2011/057676.
(Continued)

*Primary Examiner* — Christopher Besler
(74) *Attorney, Agent, or Firm* — Howard & Howard Attorneys PLLC

(57) ABSTRACT

A method for manufacturing a structural element comprises steps of providing separate first and second half-shells made of at least one layer of composite material including a fiber-reinforced polymeric matrix, providing a core made of ductile material, joining the core to the first half-shell such that at least one cavity is defined inside the structural element, and joining the second half-shell to the first half-shell.

7 Claims, 4 Drawing Sheets

(51) Int. Cl.
  *B62D 29/00* (2006.01)
  *E04C 3/28* (2006.01)
  *B29C 65/02* (2006.01)
  *B29C 65/48* (2006.01)
  *B29C 65/00* (2006.01)

(52) U.S. Cl.
  CPC ...... *B29C 66/742* (2013.01); *B29C 66/74283* (2013.01); *B60G 2200/1424* (2013.01); *B60G 2206/013* (2013.01); *B60G 2206/10* (2013.01); *B60G 2206/122* (2013.01); *B60G 2206/30* (2013.01); *B60G 2206/60* (2013.01); *B60G 2206/7101* (2013.01); *B60G 2206/7105* (2013.01); *B60G 2206/722* (2013.01); *B60G 2206/82* (2013.01); *B60G 2206/821* (2013.01); *Y10T 29/49622* (2015.01)

(56) References Cited

U.S. PATENT DOCUMENTS

| | | | | |
|---|---|---|---|---|
| 5,507,522 | A * | 4/1996 | Ritchie | 280/800 |
| 6,017,048 | A | 1/2000 | Fritschen | |
| 6,030,570 | A | 2/2000 | McLaughlin | |
| 6,510,763 | B1 * | 1/2003 | Streubel et al. | 74/588 |
| 7,159,880 | B2 | 1/2007 | Budde et al. | |
| 2001/0036559 | A1 | 11/2001 | Haack et al. | |
| 2002/0005621 | A1 * | 1/2002 | Christophliemke et al. | 280/124.134 |
| 2004/0131418 | A1 | 7/2004 | Budde et al. | |
| 2004/0145215 | A1 * | 7/2004 | Taguchi et al. | 296/187.02 |
| 2006/0016078 | A1 * | 1/2006 | Bladow et al. | 29/897.312 |
| 2007/0277926 | A1 * | 12/2007 | Naughton et al. | 156/243 |
| 2008/0106123 | A1 * | 5/2008 | Lakic | 296/205 |
| 2008/0178467 | A1 * | 7/2008 | Hayashi et al. | 29/897.2 |
| 2010/0212823 | A1 * | 8/2010 | Shibata et al. | 156/273.9 |

FOREIGN PATENT DOCUMENTS

| | | |
|---|---|---|
| EP | 0712741 A1 | 5/1996 |
| FR | 2799717 A1 | 4/2001 |
| WO | 03/039892 A1 | 5/2003 |
| WO | 03/039893 A1 | 5/2003 |
| WO | WO 2009041315 A1 * | 4/2009 |
| WO | WO 2010007481 A1 * | 1/2010 |

OTHER PUBLICATIONS

Jun. 7, 2011 Written Opinion for PCT/EP2011/057676.

* cited by examiner

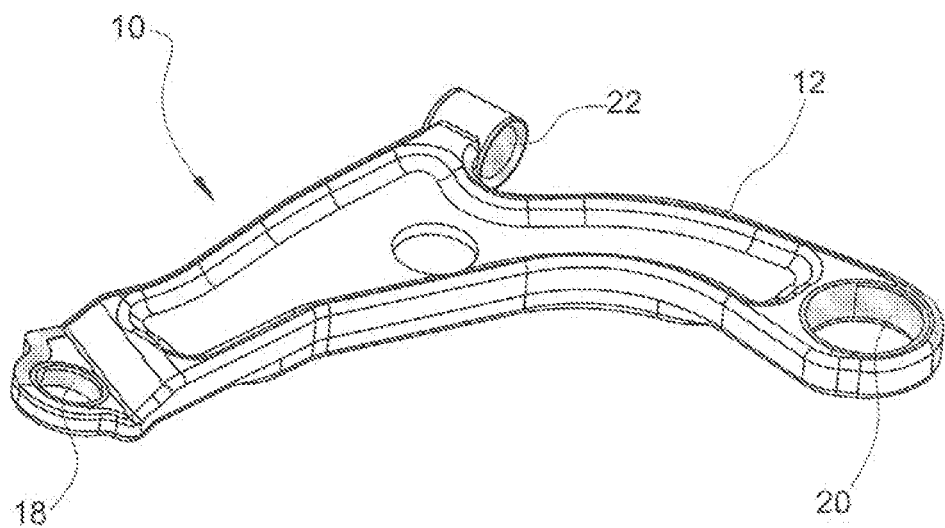
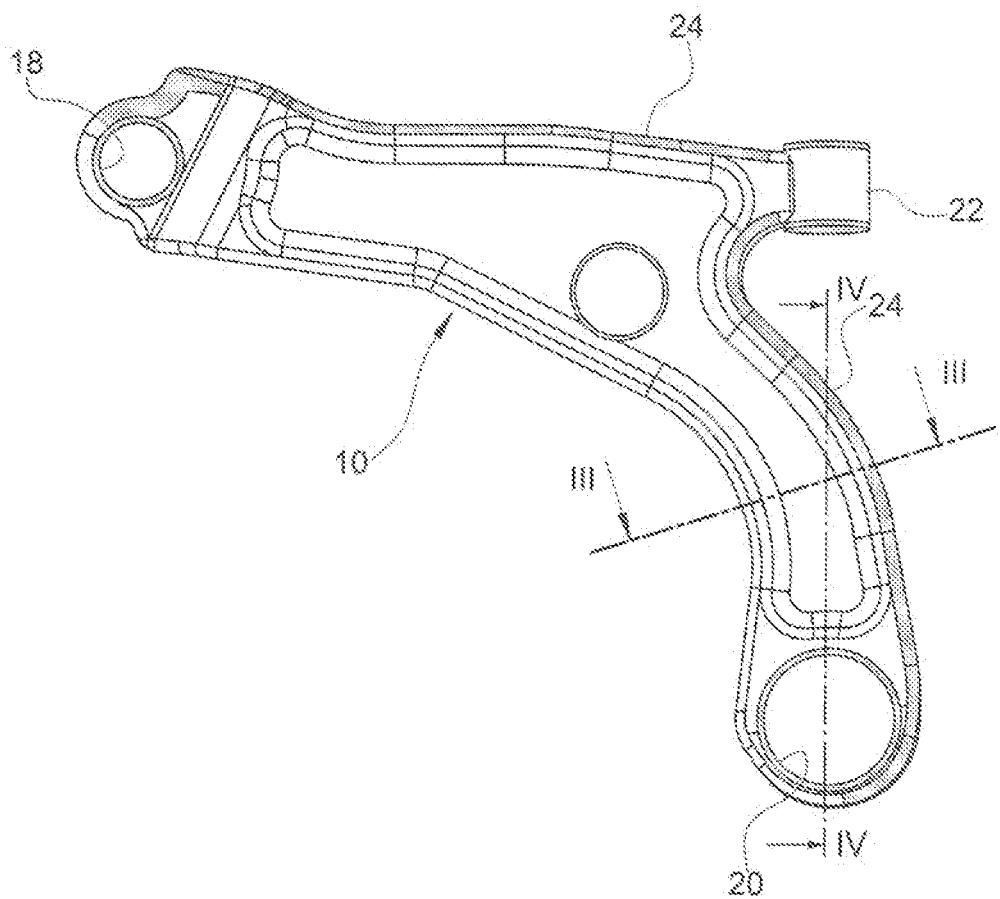

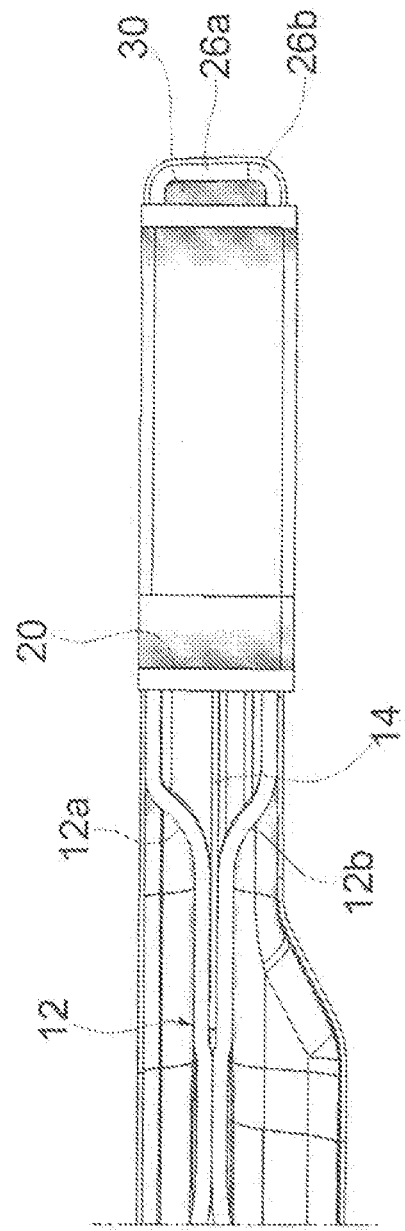

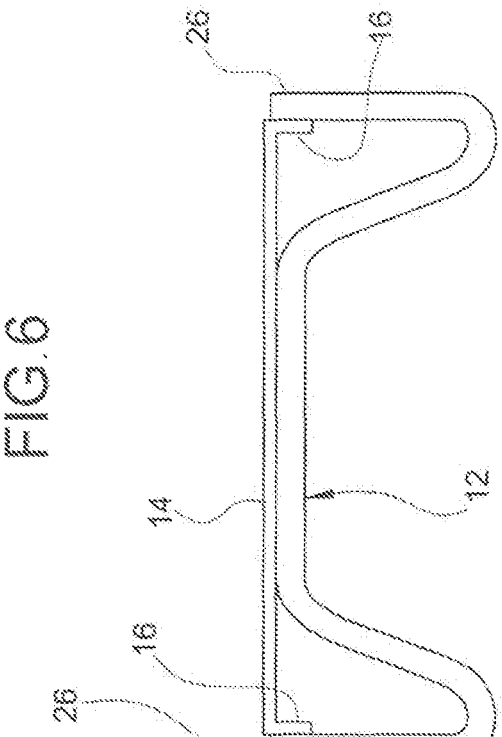
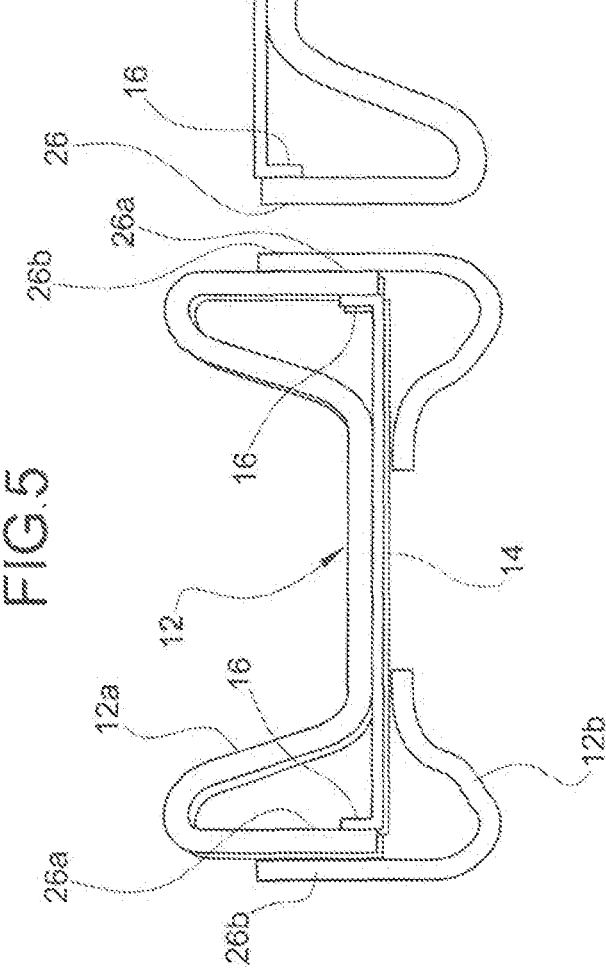

COMPOSITE STRUCTURAL ELEMENT, PARTICULARLY FOR A VEHICLE SUSPENSION, AND METHOD FOR MANUFACTURING THE SAME

CROSS-REFERENCE TO RELATED APPLICATIONS

This application claims priority to PCT Patent Application PCT/EP2011/057676 entitled "Composite Structural Element, Particularly for a Vehicle Suspension, and Method for Manufacturing the Same" and filed on May 12, 2011, which claims benefit of the filing date of Italian Patent Application TO2010A000395 filed on May 12, 2010.

BACKGROUND OF INVENTION

1. Field of Invention

The invention relates, generally, to a composite structural element and, particularly, to such an element for use in a vehicle suspension as well as a method for manufacturing the element.

2. Description of Related Art

The materials generally used in mass production of components for vehicle suspensions, such as motorcar suspensions, are steel, cast iron, and aluminium for reasons due to costs of production and performances of the material (weight, stiffness, "fatigue" life, resistance to limit load conditions, etc.). The use of composite materials for the production of motorcar-suspension components is traditionally limited to racing cars, such, as the "Formula 1" cars or so-called "supercars," as in this case the weight and performance requirements are of higher importance than the cost.

In the design of components for vehicle suspensions (in particular, for motorcar suspensions), a number of requirements conflicting with each other must be complied with. In particulars, a motorcar-suspension component must be capable of bearing certain kinds of loads (the so-called "fatigue loads"), representative of the normal use of the vehicle, although in heavy conditions. These loads are applied alternately onto the component, and this latter must not suffer from crack formation or failures within a given number of "fatigue" cycles applied. High-strength materials, such as fibre-based composite materials, are suggested in order to fulfil this "fatigue life" requirement and to limit, at the same time, the weight. Another structural requirement that must be fulfilled by the motorcar-suspension component is that the component must be able to deform in a predictable and particular way under so-called "misuse loads" (i.e., under "limit load" conditions). With such a kind of stresses, the component must be able to deform, reacting with a given reaction load and absorbing a given amount of energy, but connection between wheel and vehicle must always be ensured. In particular, any possible failure must be confined to given zones and must not occur below a given amount of deformation. Ductile materials, such as steel, are suggested in order to fulfil these requirements for controlled deformation and for presence of a "deformation witness" mark under "limit load" conditions.

U.S. Pat. No. 7,159,880 discloses a structural element (in particular, for a vehicle chassis) comprising an elongated body and a pair of connection members mounted at the opposite ends of the elongated body, wherein the elongated body consists of a metal core on which fibre-reinforced, plastic material is over-moulded by injection moulding so as to provide the elongated body with a cross-section having the desired shape. On the one hand, the use of a fibre-reinforced plastic material allows to limit the weight of the component and to ensure, at the same time, high mechanical properties while, on the other hand, the use of a metal core avoids the loss of functionality of the component even in case of damage. Such a known solution is, however, affected by the drawback that the use of the over-moulding technique to produce the plastic material portion of the structural element makes it possible to obtain only structural elements with a solid cross-section. This inevitably involves limits to the freedom of the designer in designing the cross-section of the element, which limits are excessively penalizing, for instance, in case of structural elements intended to be used for triangular suspension arms. As is known, in order to increase the strength of the structural element, it is necessary to increase the moment of inertia of the cross-section thereof [in other words, to shift the material of the cross-section as far as possible from the middle plane thereof (in the present case, from the metal core), which results in an excessive increase in the overall weight of the element].

Further examples of structural elements comprising a metal core on which plastic material (if necessary, reinforced with fibres) is over-moulded are known from U.S. Pat. No. 6,030,570 and International Patent Application Publications WO2003/039893 and WO2003/039892. Also, these structural elements suffer from the same drawback discussed above with reference to U.S. Pat. No. 7,159,880.

U.S. Patent Application Publication 2004/0131418 discloses a structural element comprising a first part of metal having a U-shaped cross-section and a second part of plastic material that is attached to the first part to close the U-shaped cross-section thereof, thus forming a hollow structural element having a closed cross-section. The first and second parts are obtained separately from each other and are then joined to each other by bending the edge of the second part onto the edge of the first part with the use of heat or ultrasounds. On the one hand, this known solution offers the advantage of reducing the overall weight of the structural element due to one of the two parts of which the element consists being made of plastic material instead of metal. On the other hand, the weight reduction allowed by this known solution is minimum, as the cross-section of the structural element is mainly formed by the first part (i.e., by the metal part).

It is, therefore, an object of the invention to provide a composite structural element that is able to offer similar or better performances with respect to the prior art with a smaller weight.

SUMMARY OF INVENTION

The invention overcomes the disadvantages in the related art in a method for manufacturing a structural element comprising steps of providing separate first and second half-shells made of at least one layer of composite material including a fibre-reinforced polymeric matrix, providing a core made of ductile material, joining the core to the first half-shell such that at least one cavity is defined inside the structural element, and joining the second half-shell to the first half-shell.

In short, the invention is based on the idea of providing a structural element comprising a shell and a core, wherein the shell is made of at least one layer of composite material comprising a fibre-reinforced polymeric matrix and wherein the core is made of a ductile material (in particular, of metal). In the following description and claims, the term "shell" is to be intended as referring to any kind of body defining at least one cavity, wherein such a body may be formed indifferently by a single piece or by several pieces joined to each other and may indifferently have either a closed cross-section or an open cross-section (in which case, naturally, the shell is not a flat element). The simultaneous presence of a material having high mechanical properties (material of the shell) and of a ductile material (material of the core) allows to meet at the same time the opposite requirements for "fatigue" life, reaction load, modality of deformation, and presence of a "deformation witness" mark under "limit load" conditions. The "fatigue" life and the reaction load under "limit load" conditions are ensured, in particular, by the high-strength material of the shell, and, in this connection, the shell is suitably shaped to provide the element with the "inertia" characteristics required each time by the specific application. The ability to absorb impact energy, the ability to provide a "deformation witness" mark, and the ability to avoid failures (such as to lead to the separation of parts) are ensured, on the other hand, by the ductile material of the core. The use of composite material for the shell of the structural element, which forms the main portion of the structural element in terms of volume of material, clearly allows to reduce the overall weight of the element with respect to the prior art.

The polymeric matrix of the composite material of the shell may consist of a thermoplastic polymer or a thermosetting polymer (such as epoxy resin). The fibres of the composite material of the shell may be either oriented fibres or short randomly-oriented fibres. Carbon fibres, "Kevlar®" fibres, glass fibres, metal fibres, or fibres of any other material adapted to provide the composite material with the required high mechanical properties may be used. In case of a shell made as a body with a closed cross-section, it advantageously comprises two half-shells joined to each other by heating to a temperature such as to cause the fusion of the polymeric matrix of the composite material. Heat may be supplied by contact with hot surfaces (for instance, with a thermo-regulated mould) or by laser-welding.

The core is advantageously made of sheet metal (in particular, of a sheet of high-strength steel) and is suitably shaped so as to have bosses or changes of plane (if required due to structural reasons). The core may be made as a single piece obtained, for instance, by stamping or, alternatively, may comprise a plurality of separate pieces, which are each obtained, for instance, by stamping and are securely connected to each other by various joining techniques (for instance, by welding, riveting, or gluing).

Since the structural element comprises a part (namely, the part made of composite material) made as a shell, voids are present between the shell and the core, which voids may indifferently be connected to each other to form a single cavity or form separate cavities. The cavities existing between the core and the shell may be filled with filler material having the function of providing the structural element with ductility and/or mechanical strength. Naturally, the filler material may also be provided only in some of the cavities.

When it is used as a component tor a vehicle suspension, the structural element may be provided with one connection member or more connection members, such as articulation bushes. To this end, the structural element further comprises at least one cylindrical sleeve or pin intended to form each a seat tor the respective bush. When the core of the structural element is made of metal, the cylindrical sleeves may also be made of metal and be directly welded to the core. Alternatively, the cylindrical sleeves may be glued or joined in any other ways to the shell of the structural element.

Other objects, features, and advantages of the invention are readily appreciated as the invention becomes better understood while a subsequent detailed description of embodiments of the invention is read taken in conjunction with the accompanying drawing thereof.

BRIEF DESCRIPTION OF THE DRAWINGS

FIGS. 1 and 2 are a perspective view and a plane view, respectively, of a triangular arm for a motorcar suspension as an example of a structural element according to an embodiment of the invention;

FIG. 4 is a sectional view of the triangular arm of FIGS. 1 and 2 through the sectional plane indicated "IV-IV" in FIG. 2; and FIGS. 5 and 6 are sectional views of two respective alternative embodiments of a structural element according to the invention.

DETAILED DESCRIPTION OF THE INVENTION

Figure 3:
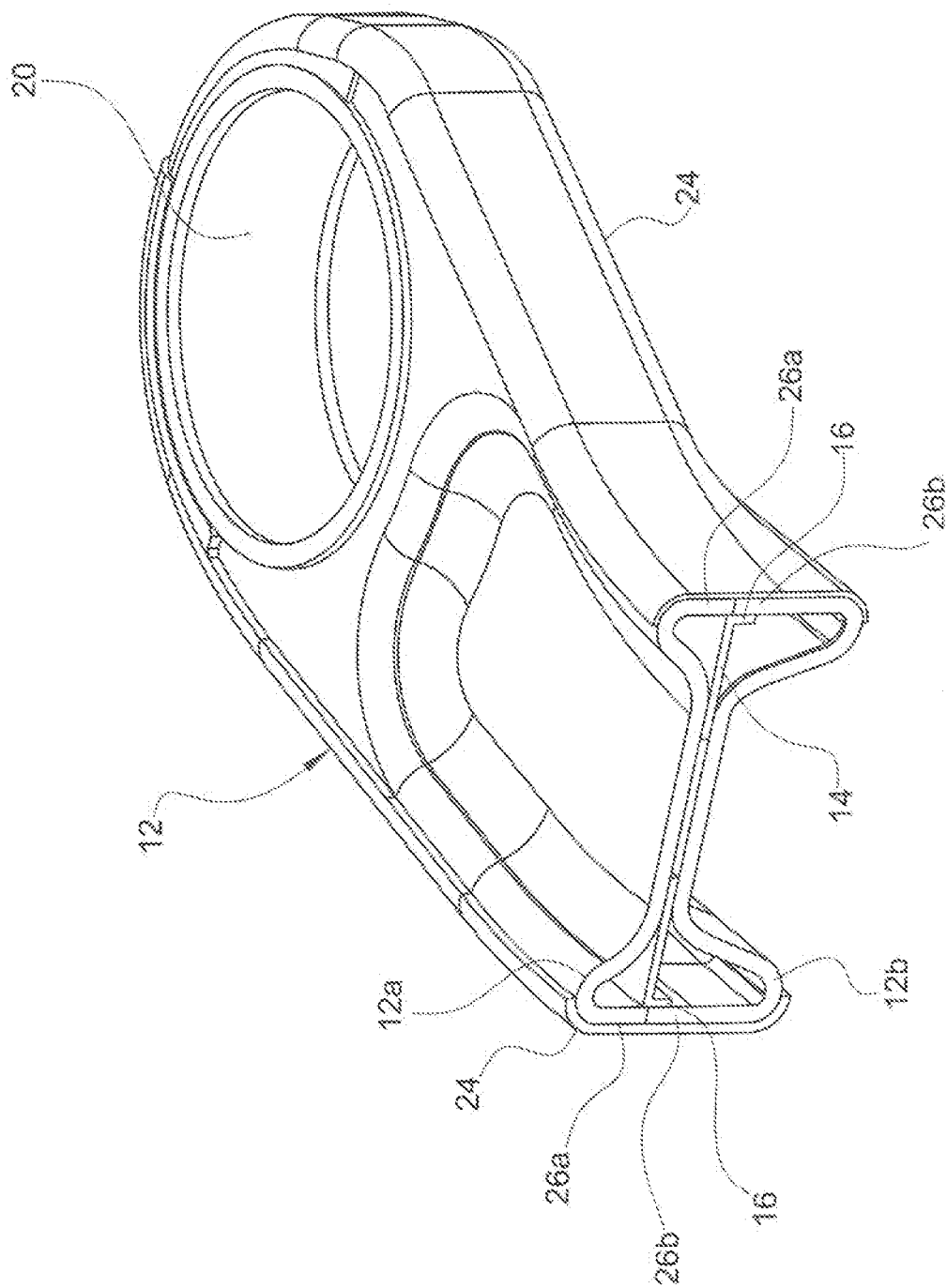
FIG. 3 is a sectional view of the triangular arm of FIGS. 1 and 2 through the sectional plane indicated "III-III" in FIG. 2.

With reference first to FIGS. 1 to 4, "10" generally indicates a triangular arm for a motorcar suspension as an example of a structural element according to the invention. However, the invention is applicable to any other structural element for a vehicle, not necessarily an element intended to be used as a suspension component.

The arm 10 basically comprises a shell 12 of composite material, a core 14 (FIGS. 3 and 4) of ductile material, and a plurality of seats (in the present case, three seats) for receiving each a respective connection member (not shown), such as a bush or a ball joint, for connection of the arm, on the one hand, to a wheel-carrier (not shown) and, on the other hand, to the vehicle body (also not shown).

The shell 12 is a body that is shaped so as to define at least one cavity and, in particular (in the example illustrated in the drawing), is a hollow body having a closed cross-section. The shell 12 is made of at least one layer of composite material having a fibre-reinforced polymeric matrix. The polymeric matrix may consist of a thermoplastic polymer or of a thermosetting polymer (such as epoxy resin) while the fibres may be oriented fibres (for instance, carbon fibres, "Kevlar®" fibres, glass fibres, metal fibres, or fibres of any other material suitable to provide the composite material with the required high mechanical properties) or short randomly-oriented fibres (in other words, short non-oriented fibres). In case of oriented fibres, the shell is advantageously made of more layers of composite material overlapped with each other whereas, in case of short non-oriented fibres, the shell consists of a single layer of composite material. Naturally, the orientation of the fibres (in case of oriented fibres) as well as the texture of the fibre and the sequence of overlapping of the various layers are chosen so as to provide the shell with the desired mechanical properties. As can be seen in FIGS. 3 and 4, in case of a shell 12 made as a hollow body having a closed cross-section, it consists of two or more pieces that are produced separately from each other and are then joined to each other so as to obtain a closed cross-section. In the proposed example, the shell 12 consists of two half-shells 12a, 12b (that is to say, an upper half-shell and a lower half-shell, respectively). The two half-shells 12a, 12b are advantageously joined to each other by heating to a temperature such as to cause the fusion of the polymeric matrix of the composite material. In this case, heat may be supplied by contact with hot surfaces (for instance, with a thermo-regulated mould) or by laser-welding. Alternatively, the two half-shells 12a, 12b are glued to each other with suitable structural adhesives.

The core 14 is, in an embodiment, made of metal as ductile material (in particular, of high-strength steel). However, the core 14 might also be made of non-metal material, provided it has adequate properties in terms of resiliency and ductility. In the example of FIGS. 1 to 4, where the shell 12 is a hollow body having a closed cross-section, the core 14 is inserted and attached inside the shell. In an embodiment, the core 14 extends substantially over the whole plan of the structural element 10, apart from the end zones of the element where the aforesaid seats are provided. Alternatively, the core 14 might, however, extend only in given zones of the structural element (in particular, in a "controlled deformation" zone) where there might be risks of failure of the shell with resulting loss of continuity of the material of the element. The core 14 is advantageously made of sheet metal and is suitably shaped so as to have bosses and/or changes of plane where it is required due to structural reasons. As can be seen in the sectional view of FIG. 3, the core 14 has, for instance, a cross-sectional profile forming a straight middle section and, at the opposite ends of the middle section, a pair of tabs 16 bent at an angle (for instance, at a right angle) to the middle section. On the one hand, the tabs 16 have the function of increasing the bending stiffness of the core 14. On the other hand, in case of the shell 12 being obtained by joining of the two half-shells 12a, 12b, the tabs 16 have the function of supporting the upper half-shell during the step of joining the two half-shells 12a, 12b when this step is carried out by heating. However, the tabs 16 might even not be present. The core 14 may be made as a single piece obtained, for instance, by stomping or may alternatively comprise a plurality of separate pieces, which are each obtained, for instance, by stamping and are securely connected to each other by various joining techniques (for instance, by welding, riveting, or gluing).

The core 14 is joined to the shell 12 at the flat middle portions of the structural element (straight middle section of the cross-section of the structural element shown in FIG. 3). Joining between the core 14 and the shell 12 is obtained by gluing or riveting. In case of a core 14 having lateral tabs 16, the core might be joined to the shell 12 also at these tabs. Moreover, the core 14 may have holes or slots, in which ease the hall-shells 12a, 12b are in contact with each other and joined by gluing or riveting at these holes or slots.

The shell 12 and the core 14 are shaped in such a manner that voids are defined between these two components, which voids may indifferently be connected to each other to form a single cavity or form separate cavities. In the zones of the structural element where the core is not present, the cavities are enclosed only by the material of the shell (instead of being enclosed partly by the shell and partly by the core). The aforesaid cavities may be filled with filler material having the function of providing the structural element with ductility and/or strength. In this connection, FIG. 4 shows a cavity (indicated at 30 and located around one of the aforesaid seats of the arm) that is filled with filler material.

In the proposed embodiment, in which the structural element is a suspension arm (in particular, a triangular arm), the structural element is provided with one connection member or more connection members (in the present case, three connection members), such as articulation bushes. To this end, the arm 10 comprises three sleeves or cylindrical tubular elements 18, 20, 22 of which the first two have a vertical axis and the third one has a horizontal axis and that are intended to form each a seat for driving the respective articulation bush therein. The cylindrical sleeves 18, 20, 22 may also be made of metal and be directly welded to the core 14. In addition or as an alternative to being attached to the core 14, the cylindrical sleeves 18, 20, 22 may be glued or joined in any other ways to the shell 12.

Reinforcement layers 24 of composite material may also be attached to the shell 12 and are advantageously made of the same material as that of the shell. The reinforcement layers 24 may be attached to the shell 12 by fusion or gluing. A localized reinforcement of the arm in the areas subject to the highest stresses is, thus, obtained.

With reference finally to FIGS. 4 and 5, where parts and elements identical or corresponding to those of FIGS. 1 to 3 have been given the same reference numerals, two examples of alternative embodiments of a structural element according to the invention are shown. Different than the embodiment of FIGS. 1 to 4, where the two half-shells 12a, 12b are joined to each other with the respective edges (indicated "26a" for the upper half-shell, and "26b" for the lower half-shell in FIGS. 3 and 4), in the embodiment of FIG. 5, the two half-shells 12a, 12b are joined to each other with the respective edges 26a, 26b overlapping with each other. Additionally, as specified above, the two half shells 12a, 12b may be joined to each other by gluing or riveting also at holes or slots provided in the core 14. In the embodiment of FIG. 6, the shell 12 of the structural element is made as a single piece of composite material with an open cross-section, and the core 14 is attached to the shell 12 (in particular, by gluing of the tabs 16 of the core to the edges 26 of the shell) so as to form with this latter an element having a closed cross-section.

The following steps are basically provided for the manufacturing of a structural element according to the invention:
a) providing a shell 12 made of at least one layer of composite material, comprising a fibre-reinforced polymeric matrix;
b) providing a core 14 made of ductile material; and
c) joining the core 14 to the shell 12.

In case of the shell 12 being made as a hollow body having a closed cross-section comprising two half-shells 12a, 12b, step "a)" provides for the two half-shells 12a, 12b being obtained separately from each other, step "c)" provides for the core 14 being joined to one of the two half-shells 12a, 12b (the half-shell 12b in the embodiment of FIG. 3 and the half-shell 12a in the embodiment of FIG. 5), and a further step "d)" provides for the second half-shell being joined to the first half-shell and, if necessary, also to the core 14. In this connection, as already mentioned, the two half-shells 12a, 12b are advantageously joined to each other by heating to a temperature such as to cause the fusion of the polymeric matrix of the composite material [the heat required to cause the fusion of the polymeric matrix of the composite material being supplied by contact with hot surfaces (for instance, with a thermo-regulated mould) or by laser-welding]. Alternatively, the two half-shells 12a, 12b may be glued to each other with suitable structural adhesives.

As far as step "b)" is concerned, as already stated above, the core 14 may be produced as a single piece obtained, for instance, by stamping or may alternatively comprise a plurality of separate pieces, which are each obtained, for instance, by stamping and are securely connected to each other with various joining techniques (for instance, by welding, riveting, or gluing).

The invention has been, described above in an illustrative manner. It is to be understood that the terminology that has been used above is intended to be in the nature of words of description rather than of limitation. Many modifications and variations Of the invention are possible in light of the above teachings. Therefore, within the scope of the appended claims, the invention may be practiced other than as specifically described above.

What is claimed is:

1. A method for manufacturing a structural element for a vehicle suspension, the method comprising steps of:
   providing separate first and second half-shells made of at least one layer of composite material including a fiber-reinforced polymeric matrix;
   providing a core made of metal, wherein the core comprises a flat middle portion having peripheral edges and lateral tabs bent at an angle to the middle portion and extending from the peripheral edges of the middle portion;
   joining the core to the first half-shell both at the middle portion and at the lateral tabs of the core such that at least one cavity is defined between the core and the first half-shell; and
   after the step of joining the core to the first half-shell, joining the second half-shell to the first half-shell to form a shell such that the core is arranged within said shell.

2. The method as set forth claim 1, wherein the first and second half-shells are joined to each other by heating to a temperature to cause fusion of the polymeric matrix of the composite material.

3. The method as set forth in claim 1, wherein the first and second half-shells are joined to each other by gluing.

4. The method as set forth in claim 1, wherein the core is made as a single piece.

5. The method as set forth in claim 1, wherein the core is made by joining a plurality of separate pieces.

6. The method as set forth in claim 1, wherein the method comprises further a step of filling the cavity with filler material.

7. The method as set forth in claim 1, wherein the lateral tabs are bent at a right angle to the middle portion of the core.

* * * * *